(12) United States Patent
Cher et al.

(10) Patent No.: US 9,317,350 B2
(45) Date of Patent: Apr. 19, 2016

(54) METHOD AND APPARATUS FOR FAULTY MEMORY UTILIZATION

(71) Applicant: International Business Machines Corporation, Armonk, NY (US)

(72) Inventors: Chen-Yong Cher, Port Chester, NY (US); Carlos H. Andrade Costa, White Plains, NY (US); Yoonho Park, Chappaqua, NY (US); Bryan S. Rosenburg, Cortlandt Manor, NY (US); Kyung D. Ryu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 14/022,171

(22) Filed: Sep. 9, 2013

(65) Prior Publication Data

US 2015/0074367 A1 Mar. 12, 2015

(51) Int. Cl.
*G06F 11/00* (2006.01)
*G06F 11/07* (2006.01)

(52) U.S. Cl.
CPC ..................... *G06F 11/07* (2013.01)

(58) Field of Classification Search
CPC .... G11B 20/18; G11B 29/56; G11B 20/1883; G11C 29/56; G06F 11/0727
IPC ....................................................... G11B 20/18
See application file for complete search history.

(56) References Cited

U.S. PATENT DOCUMENTS

| 5,237,673 | A | * | 8/1993 | Orbits et al. | 711/170 |
|---|---|---|---|---|---|
| 5,269,013 | A | * | 12/1993 | Abramson et al. | 711/170 |
| 6,078,455 | A | * | 6/2000 | Enarson et al. | 360/68 |
| 6,401,214 | B1 | * | 6/2002 | Li | 714/6.3 |
| 6,415,189 | B1 | * | 7/2002 | Hajji | 700/79 |
| 6,460,151 | B1 | * | 10/2002 | Warwick et al. | 714/718 |
| 6,571,354 | B1 | * | 5/2003 | Parks et al. | 714/6.32 |
| 6,598,174 | B1 | * | 7/2003 | Parks et al. | 714/6.22 |
| 6,735,549 | B2 | * | 5/2004 | Ridolfo | 702/181 |
| 6,771,440 | B2 | * | 8/2004 | Smith | 360/31 |
| 6,816,982 | B2 | * | 11/2004 | Ravid | 714/20 |

(Continued)

OTHER PUBLICATIONS

Wang et al., "Proactive Process-Level Live Migration and Back Migration in HPC Environments," preprint submitted to Journal of Parallel and Distributed Computing, pp. 1-31, Nov. 7, 2011.

(Continued)

*Primary Examiner* — Amine Riad
(74) *Attorney, Agent, or Firm* — Daniel P. Morris, Esq.; Otterstedt, Ellenbogen & Kammer, LLP (57) ABSTRACT

A method for faulty memory utilization in a memory system includes: obtaining information regarding memory health status of at least one memory page in the memory system; determining an error tolerance of the memory page when the information regarding memory health status indicates that a failure is predicted to occur in an area of the memory system affecting the memory page; initiating a migration of data stored in the memory page when it is determined that the data stored in the memory page is non-error-tolerant; notifying at least one application regarding a predicted operating system failure and/or a predicted application failure when it is determined that data stored in the memory page is non-error-tolerant and cannot be migrated; and notifying at least one application regarding the memory failure predicted to occur when it is determined that data stored in the memory page is error-tolerant.

20 Claims, 4 Drawing Sheets

(56) References Cited

U.S. PATENT DOCUMENTS

| | | | |
|---|---|---|---|
| 7,103,509 B2* | 9/2006 | Shah et al. ................. 702/185 |
| 7,434,097 B2* | 10/2008 | Guha et al. ................. 714/6.32 |
| 7,526,684 B2* | 4/2009 | Bicknell et al. .............. 714/47.2 |
| 7,730,364 B2* | 6/2010 | Chang et al. ................ 714/47.2 |
| 7,877,645 B2* | 1/2011 | Meyer et al. ................ 714/47.3 |
| 7,984,333 B2* | 7/2011 | Ruan et al. .................... 714/37 |
| 8,032,723 B2 | 10/2011 | Sechrest et al. |
| 8,069,190 B2 | 11/2011 | McColl et al. |
| 8,103,463 B2* | 1/2012 | Kalgren et al. ................ 702/57 |
| 8,185,784 B2* | 5/2012 | McCombs et al. ........... 714/47.2 |
| 8,365,009 B2 | 1/2013 | Dournov et al. |
| 2004/0051988 A1* | 3/2004 | Jing et al. ..................... 360/31 |
| 2007/0079170 A1* | 4/2007 | Zimmer et al. ................. 714/6 |
| 2008/0127182 A1* | 5/2008 | Newport et al. ................. 718/1 |
| 2012/0254582 A1* | 10/2012 | Raj et al. ..................... 711/206 |
| 2012/0265741 A1 | 10/2012 | Moon et al. |
| 2012/0324443 A1 | 12/2012 | Low et al. |
| 2013/0014107 A1 | 1/2013 | Kirchhofer |

OTHER PUBLICATIONS

Engelmann et al., "Proactive Fault Tolerance Using Preemptive Migration," Proceedings of the 17th Euromicro Conference on Parallel, Distributed and Network-based Processing, IEEE Computer Society, pp. 252-257, Feb. 2009.

Hacking et al., "Improving the Live Migration Process of Large Enterprise Applications," VTDC '09: Proceedings of the 3rd Int'l Workshop on Virtualization Technologies in Distributed Computing, pp. 51-58, 2009.

Liang et al., "BlueGene/L Failure Analysis and Prediction Models," Proceedings of the 2006 Int'l Conference on Dependable Systems and Networks (DSN'06), IEEE Computer Society, pp. 1-10, Jan. 2006.

* cited by examiner

METHOD AND APPARATUS FOR FAULTY MEMORY UTILIZATION

STATEMENT OF GOVERNMENT RIGHTS

This invention was made with Government support under Contract No. B599858 awarded by the Department of Energy. The Government has certain rights in this invention.

BACKGROUND

The present invention relates generally to electrical, electronic and computer arts, and more particularly relates to memory components and systems.

Frequent system failures due to an increased number of uncorrected memory errors corrupting critical data is a major problem when scaling current high-performance computing (HPC) systems. Mechanisms for fault handling have been deployed at various levels of the software stack, ranging from application and runtime levels, to operating system-level schedulers. Checkpoint/restart techniques have been used as an approach to react to and recover from the occurrence of a system failure. Checkpoint/restart is a facility of the operating system that allows information about an application to be recorded (e.g., in the form of a checkpoint) so that the application can be restarted from the point where it was interrupted after an abnormal termination. A checkpoint is a copy of the system's memory that is periodically saved on disk along with current register settings (e.g., last instruction executed, etc.) and any other status indicators. In the event of a system failure, the last checkpoint serves as a recovery point.

Health monitoring capabilities are features commonly employed in commodity and HPC components. Such features have been used to develop predictive failure models and to guide a determination of optimized checkpointing intervals in reactive fault management techniques. Research on the analysis of log files for prediction purposes demonstrates that accurate models for memory failure prediction can be obtained from memory error event history. Proactive schemes exploiting health monitoring capabilities for failure prediction, such as, for example, process-level migration from healthy to unhealthy nodes, have been proposed. The tolerance of a set of scientific applications to the impacts of uncorrected errors has been shown, and also the potential benefits of cooperative fault recovery mechanisms.

It has been projected that standard fault-tolerant methods will not be sufficient to handle expected memory error rates affecting next-generation HPC systems. As systems scale, mechanisms to avoid critical errors otherwise capable of causing a system failure (e.g., crash), and at the same time allowing the system to continue running in the presence of tolerable errors, will be required. However, while proactive solutions exist, such solutions are highly dependent upon specific system implementations at different layers, and are thus undesirable.

BRIEF SUMMARY

Principles of the invention, according to embodiments thereof, provide techniques for proactive memory reassignment at an operating system level in response to a notification of imminent memory failure. One or more embodiments of the invention facilitate the migration of memory pages when an imminent memory failure is predicted in at least a portion of the memory storing data identified as being critical. By making a distinction between error-tolerant and non-error-tolerant data, one or more embodiments of the invention help prevent a system crash, or alternative failure, due to critical data corruption, while enabling the continued usage of an otherwise faulty memory area for error-tolerant data allocation. For the distinction of error-tolerant and non-error-tolerant data, one or more embodiments of the invention provide an application programming interface (API) that allows the programmer to identify data regions that are error-tolerant when writing the application. These application inputs may be used at runtime to determine memory reassignment based on data criticality.

In accordance with an embodiment of the invention, a method for faulty memory utilization in a memory system includes: obtaining information regarding memory health status of at least one memory page in the memory system; determining an error tolerance of the memory page when the information regarding memory health status indicates that a failure is predicted to occur in an area of the memory system affecting the memory page; initiating a migration of data stored in the memory page when it is determined that the data stored in the memory page is non-error-tolerant; notifying at least one application regarding a predicted operating system failure and/or a predicted application failure when it is determined that data stored in the memory page is non-error-tolerant and cannot be migrated; and notifying at least one application regarding the memory failure predicted to occur when it is determined that data stored in the memory page is error-tolerant, whereby the memory page can continue to be used.

In accordance with another embodiment of the invention, an apparatus for facilitating faulty memory utilization in a memory system includes a memory, a health tracking module operative to obtain information regarding memory health status of at least one memory page in the memory, and at least one processor coupled with the memory and health tracking module. The processor is operative: to receive the information regarding memory health status; to determine an error tolerance of the at least one memory page when the information regarding memory health status indicates that a failure is predicted to occur in an area of the memory affecting the at least one memory page; to initiate a migration of data stored in the at least one memory page when it is determined that the data stored in the at least one memory page is non-error-tolerant; to notify at least one application regarding at least one of a predicted operating system failure and a predicted application failure when it is determined that data stored in the at least one memory page is non-error-tolerant and cannot be migrated; and to notify at least one application regarding the memory failure predicted to occur when it is determined that data stored in the at least one memory page is error-tolerant, whereby the at least one memory page can continue to be used.

In accordance with yet another embodiment, a computer program product for facilitating faulty memory utilization in a memory system includes a computer readable storage medium having computer readable program code embodied therewith. The computer readable program code includes: computer readable program code configured to obtain information regarding memory health status of at least one memory page in a memory system; computer readable program code configured to determine an error tolerance of the at least one memory page when the information regarding memory health status indicates that a failure is predicted to occur in an area of the memory system affecting the at least one memory page; computer readable program code configured to initiate a migration of data stored in the at least one memory page when it is determined that the data stored in the at least one memory page is non-error-tolerant; computer readable program code configured to notify at least one application regarding at least one of a predicted operating system failure and a predicted application failure when it is determined that data stored in the at least one memory page is non-error-tolerant and cannot be migrated; and computer readable program code configured to notify at least one application regarding the memory failure predicted to occur when it is determined that data stored in the at least one memory page is error-tolerant, whereby the at least one memory page can continue to be used.

As used herein, facilitating an action includes performing the action, making the action easier, helping to carry the action out, or causing the action to be performed. Thus, by way of example only and without limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages, among others:

fault-stop avoidance with memory reassignment when memory failure is predicted;
selective handling of predictable memory failure based on data criticality distinction;
support for application inputs on data regions that can tolerate a certain degree of corruption;
preventive protection of critical data through non-disruptive memory page migration;
preemptive application notification when memory failure causing a system or application crash cannot be avoided;
support for guiding application-level fault-management with information on specific data regions to be affect by an imminent memory failure; and
support for the usage of faulty memory in controlled error-tolerant execution.

These and other features, objects and advantages of the present invention will become apparent from the following detailed description of illustrative embodiments thereof, which is to be read in conjunction with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative embodiments of a method and apparatus for facilitating the proactive migration of data stored in memory when an imminent memory failure is predicted in at least a portion of the memory. It is to be appreciated, however, that the invention is not limited to the specific methods and/or apparatus illustratively shown and described herein. Moreover, it will become apparent to those skilled in the art given the teachings herein that numerous modifications can be made to the embodiments shown that are within the scope of the claimed invention. Thus, no limitations with respect to the embodiments shown and described herein are intended or should be inferred.

Uncorrected errors in the memory of high-performance computing (HPC) systems are perhaps one of the main causes of system failures (i.e., crashes), where the system or application may need to be restarted. In addition to uncorrected memory parity check and other errors, a memory controller may account for corrected and harmless errors, and store this information in error logs in some storage means. Error logs and the monitoring of a corrected error rate and its comparison to a static threshold have been used to proactively avoid system failure or crashing; the terms "system failure" and "system crash" are used synonymously herein. However, the absolute rate of corrected memory errors, which may be determined from corrected error monitoring (or monitoring of other system characteristics and/or conditions), is not a direct indication of a probable future memory failure, since memory failure is typically a dynamic function of one or more characteristics, including, but not limited to, manufacturing variation, surrounding conditions (e.g., temperature, supply voltage, etc.) and workload phases. For example, the shift in a threshold voltage of complementary metal-oxide-semiconductor (CMOS) transistors, which are often used in memory cells, may vary widely among individual semiconductor chips before they are deployed into the field due to manufacturing process variations, including variations in semiconductor oxide thickness, effective channel length and/or width of semiconductor transistors, and burn-in tests using higher supply voltages and/or temperatures.

Another technique used to indicate the probability of memory failures is health monitoring. Health monitoring is a technique that relies on capabilities sometimes found in commodity and HPC components that provides sensor information which indicates memory and surrounding conditions. The data obtained by the sensors may be used to detect or indicate, for example, electromigration (EM), negative bias temperature instability (NBTI), positive bias temperature instability (PBTI), temperature-dependent dielectric breakdown (TDDB), and hot carrier injection (HCI), among other conditions. The correlation between the information received or obtained by the sensors is used, in accordance with one or more embodiments of the invention, to predict memory failure dynamically at runtime. In particular, when a corrected error rate increases and exceeds (e.g., crosses) a statistically-defined threshold, one or more of the above memory health degradation conditions can be detected. The interpretation of sensor data and the evaluation of a failure probability, in addition to corrected error monitoring, represents an important feature of one or more aspects of the invention.

These mechanisms—corrected error monitoring and health monitoring—have limited effectiveness as used in existing solutions. The lack of an interpretation of memory and surrounding conditions that change dynamically, such as, for example, aging rate due to fabrication variation and temperature, respectively, may limit the accuracy and applicability of existing failure anticipation mechanisms that are based solely on the monitoring of static error threshold crossing. Health monitoring has not been explored by standard approached in a way that fine-grained notifications can be generated for memory areas with an increasing probability of failure. Existing proactive failure detection mechanisms may also be highly tied to specific implementations and are not extensible to a general case. In addition, existing corrected error monitoring and health monitoring, individually, are generally not suitable for practical use at an operating system level in mechanisms to interact with the operating system's memory management to proactively avoid or manage the impacts of memory failures. The existing mechanisms lack sufficient granularity and failure modeling useful for real-time failure prediction. Additionally, these mechanisms lack a hardware-independent notification format and a way to define preferences for notification-triggering that allow the definition of a meaningful tradeoff between accuracy of the prediction of future failure and a predicted time frame for failure notification.

As previously stated, one or more embodiments of the invention provide a system, method and/or apparatus for proactively migrating data stored in memory when an imminent memory failure is predicted in at least a portion of the memory. In one or more embodiments, techniques of the invention are applicable to dynamic random access memory (DRAM), although embodiments of the invention are not limited to DRAM. In particular, one or more embodiments provide for memory degradation notification at the operating system level of an HPC system and preventive migration of prescribed data based on a notification of imminent or future memory failure. In this manner, actions can be taken to proactively avert a system failure or crash. One or more embodiments of the invention rely on a combination of both health monitoring and monitoring of corrected memory errors (e.g., corrected errors with error-correcting code (ECC), although essentially any variation in the rate of corrected error events produced by a correction mechanism can be used as a first sign of health degradation that triggers a health evaluation) to generate a notification indicating an imminent memory failure. As used herein, an imminent memory failure can be broadly defined as a future memory failure, without limitation regarding a definition of the term "imminent."

In one or more embodiments, techniques of the invention utilize the monitoring of sensors in the main memory of the HPC system at runtime to dynamically predict the likelihood of a failure occurring in one or more memory blocks at per-die or finer granularity, and the generating of a notification (e.g., using a signal) indicating an imminent memory failure. One or more embodiments provide inexpensive access to real-time corrected memory error events and reconcile the events with health monitors accessible through monitoring interfaces. In this manner, embodiments of the invention define a correlation between a corrected memory error rate increase, as determined from monitoring of corrected error, and the likelihood of a memory failure, as determined from health monitoring systems or alternative sensing means. Additionally, by including a hardware-specific correlation function in a hardware-independent failure model implementation, embodiments of the invention help ensure that health monitor readings, notification settings and event notifications are performed in a simplified and extensible way, applicable to a wide range of scenarios. In accordance with one or more embodiments, notification preferences or settings enable controlling a tradeoff between the time (or time period) necessary for taking corrective actions before a failure occurs and the overhead of ensuring against a false positive. Embodiments of the present invention provide for early signs of memory failure in proactive operating system mechanisms to be used to avoid system failure.

In some embodiments, a health tracking module performs a method for notification of predictable failure in a memory or memory segment based on memory health deterioration. The module accesses hardware-specific health indicators (e.g., sensors) generating hardware-independent notification of memory health deterioration. The method includes monitoring corrected errors rate, memory and conditions surrounding the memory, such as, for example, power, thermal and aging variations. Other suitable conditions may be monitored. The method monitors corrected error rate and use health monitoring to calculate the probability of failure in the event of an increasing corrected error rate is detected. The method also includes defining settings, via a configuration interface, for example, to be used in the calculation of a failure probability threshold for imminent failure notification. These settings may be a procedure to set either prediction accuracy of an imminent failure or action time window before an unrecoverable error (failure). This procedure may return the action time window given a specified prediction accuracy, or a prediction accuracy given a specified action time window. Then, a failure probability threshold indicating imminent memory failure is calculated with a failure model applied to a specified prediction accuracy or action time window, as will be further described below. A hardware-independent signal on the event of the failure probability crossing the calculated threshold is then generated. This is one example of how a failure notification may be generated, although it is to be appreciated that the invention is not limited to this approach, and that one or more embodiments can be used with essentially any notification of predictable failure and subsequent failure rate, as will become apparent to those skilled in the art given the teachings herein.

In one or more embodiments, a real-time corrected memory error rate is determined via memory error monitoring, and failure probability is determined based on known failure models. Then, a correlation is made between the corrected memory error rate, the probability of a memory failure and, and the failure probability threshold, which accounts for a predefined action time window or a prediction accuracy. When an increase in the corrected memory error rate is observed, a failure probability is evaluated based on the health sensors readings and failure models, and when a failure probability threshold is exceeded, a hardware-independent signal is triggered indicating the memory portion that is about to fail, an action time window of when this failure will occur, and, in some embodiments, the expected uncorrectable error rate after the failure occurs. The action time window may, in some embodiments, be based on the models described below. The expected uncorrectable error rate after the failure occurs is the rate of errors that cannot be corrected by the software (or hardware) after a system failure or crash. In some embodiments, the hardware-independent signal indicates a particular segment of the memory that is about to fail.

Figure 1:
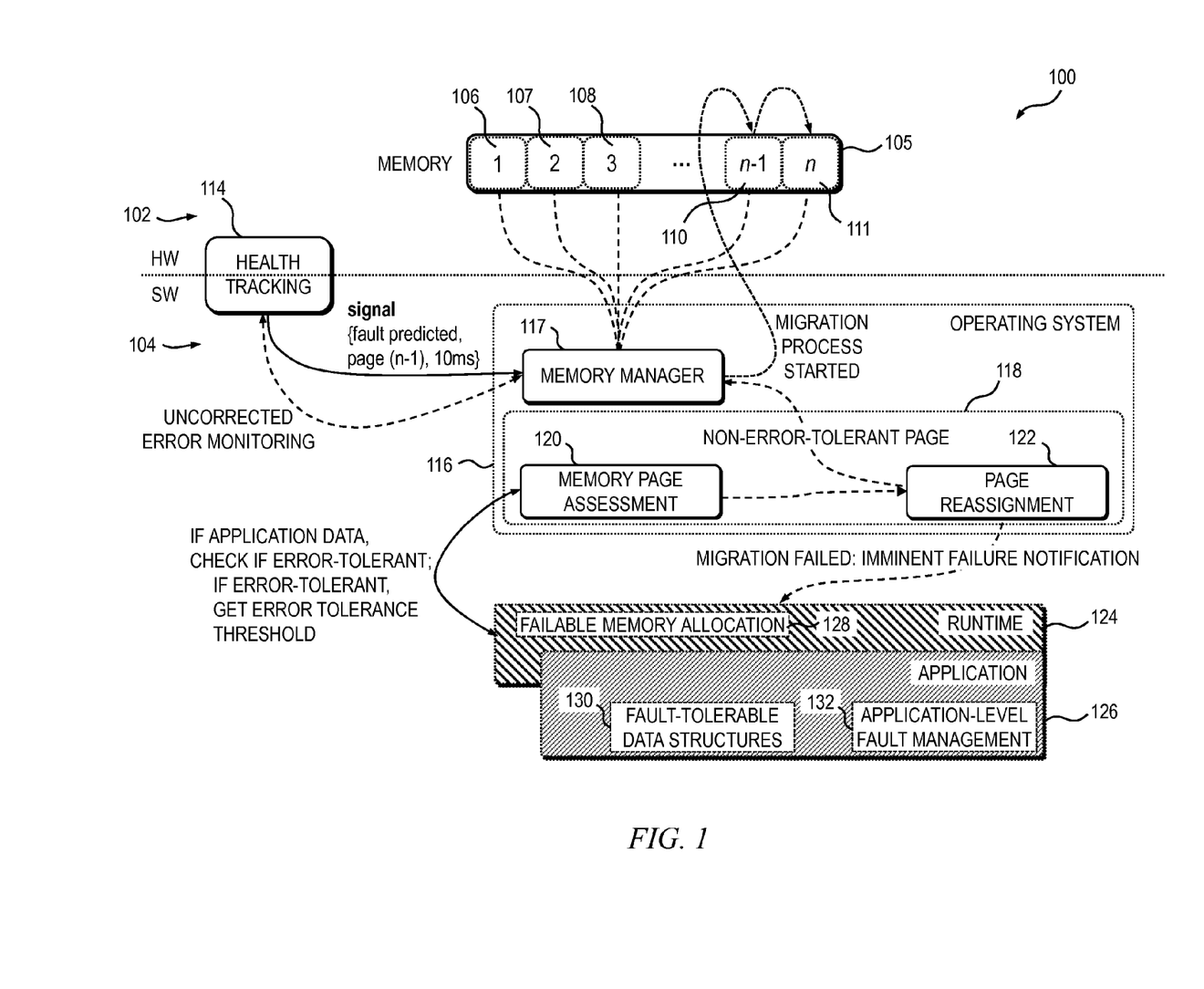
FIG. 1 is a block diagram depicting at least a portion of an exemplary memory system, according to an embodiment of the invention.

FIG. 1 is a block diagram depicting at least a portion of an exemplary HPC system 100, according to an embodiment of the invention. The exemplary system 100 includes both hardware components (HW) 102 and software components (SW) 104. In some embodiments, an interface (not explicitly shown, but implied by the dotted boundary line between the HW and SW components) is used to facilitate an interaction between the hardware components 102 and the software components 104. The interface may be a low-level interface, such as, for example, an intelligent platform management interface (IPMI) or an IBM remote supervisor adapter (RSA) interface. Other suitable interfaces may also be used, including known or proprietary interfaces.

The hardware components 102, in this embodiment, include a memory 105 organized into a plurality of physical regions. Virtual memory management is used to map the physical memory regions into a plurality of corresponding virtual memory pages, referred to herein as memory pages; namely, a first memory page 106, a second memory page 107, a third memory page 108, an (n−1)th memory page 110, and an nth memory page 111, where n is an integer. Each of the physical regions mapped into memory pages 106 through 111 preferably includes a plurality of memory cells, each memory cell being operative to store one or more bits of data. As described herein, the term "memory" is used broadly to indicate the memory as a whole or as a particular segment thereof (e.g., memory region, memory cell, etc.). Additionally, the memory 105 may comprise a standalone memory and/or an embedded memory. The memory 105 may be implemented using, for example, random access memory (RAM), such as, for instance, DRAM or static random access memory (SRAM). Other suitable memory types may also be used, including, but not limited to, content-addressable memory (CAM), phase change RAM (PCRAM), magnetic RAM (MRAM), etc.

Figure 2:
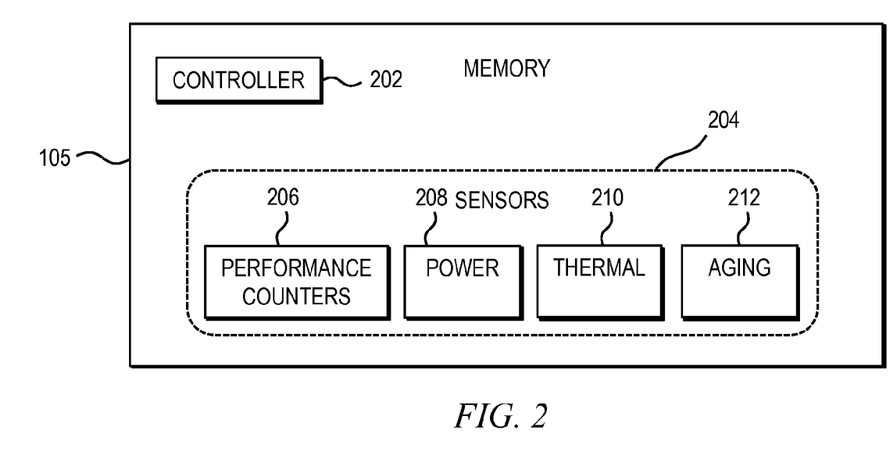
FIG. 2 is a block diagram depicting at least a portion of an exemplary memory suitable for use in the illustrative memory system shown in FIG. 1, according to an embodiment of the invention.

With reference to FIG. 2, the memory 105, in this illustrative embodiment, comprises a controller 202 operative to control an operation of the memory 105, and one or more sensors 204 operative to obtain (i.e., detect) information regarding conditions affecting the memory, or a segment thereof. For example, the sensors 204 may include access counters 206, a power monitor 208, a thermal (i.e., temperature) monitor 210, and/or an aging monitor 212, among others. One or more embodiments of the invention rely on the availability of such thermal-, power- and/or aging-related sensors. It is to be appreciated that, although the sensors 204 are depicted as being incorporated within the memory 105, in one or more embodiments, at least a subset of the sensors resides externally to the memory. For example, in one embodiment, the thermal sensor/monitor 210 may reside proximate a hardware component 102 which generates a predominant amount of heat in the HPC system 100. Furthermore, it is to be appreciated that health monitoring utilizing one or more of the sensors 204 represents one illustrative approach suitable for use with embodiments of the invention; however, essentially any mechanism for generating a memory failure prediction can be employed for proactive memory management according to one or more embodiments of the invention.

Figure 3:
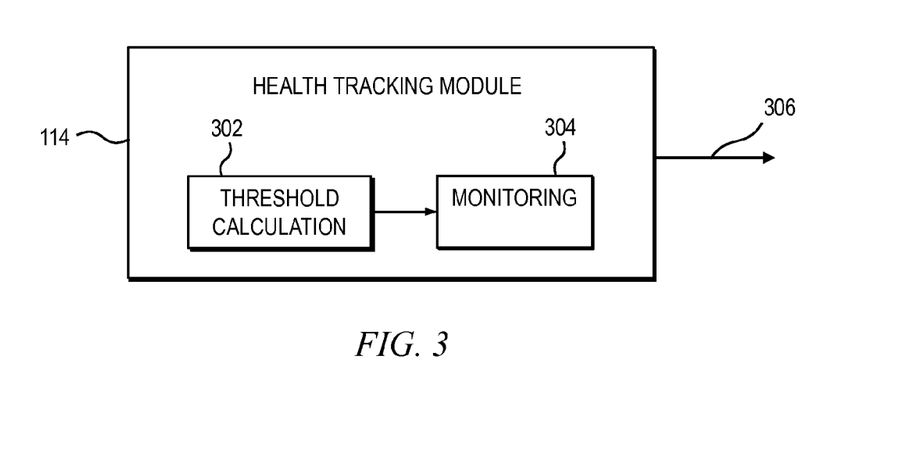
FIG. 3 is a block diagram depicting at least a portion of an exemplary health tracking module suitable for use in the illustrative memory system shown in FIG. 1, according to an embodiment of the invention.

With continued reference to FIG. 1, the system 100 includes a health tracking module 114. The health tracking module 114, which can be implemented in hardware, software, or a combination of hardware and software, is operative to access hardware-specific health indicators generating a hardware-independent notification of memory health status (e.g., memory health deterioration). FIG. 3 depicts at least a portion of an exemplary health tracking module 114 suitable for use in the illustrative system 100 shown in FIG. 1, according to an embodiment of the invention. The health tracking module 114, in this embodiment, includes a threshold calculation module 302 adapted to receive information from one or more hardware components 102, such as from the sensors 204 (FIG. 2), and/or from one or more software components 104, such as notification preferences and one or more failure models (not explicitly shown), and is operative to calculate a memory failure probability threshold as a function of the received information. The health tracking module 114, in this embodiment, further includes a monitoring module 304 operative to monitor one or more aspects of the system 100, and when the threshold calculated by the threshold calculation module 302 is exceeded, the health tracking module 114, in some instances, generates one or more signals 306 indicative of an imminent memory failure for the memory 105 as a whole, or a particular segment thereof.

Surrounding memory conditions and health indicators are accessed, in one or more embodiments, through a monitoring interface, such as, for example, a standard IPMI or alternative interface. The frequency with which information regarding the surrounding memory conditions and health indicators (as may be obtained, for example, using one or more sensors 204 shown in FIG. 2) are accessed to determine memory health status may be controlled as a function of how often variations in a corrected error rate or conditions relating to the memory 105 and/or system 100 change; for example, changes due to power efficiency optimization, etc., although other suitable changes may also apply. A fault prediction function, or similar mechanism, correlates the sensor data, such as memory performance patterns, power and temperature variations, and/or aging indicators, among other characteristics, to a probability of a memory failure occurring in a specified memory area as a function of time. The calculated memory failure probability may also be referred to herein as a probability of the occurrence of an uncorrectable error. The fault prediction function is a practical implementation of a hardware-dependent model for failure rate and is used in the calculation of a memory failure probability threshold (e.g., by the threshold calculation module 302, or an alternative mechanism) to trigger the notification of memory health deterioration. It is to be appreciated, however, that the fault prediction function is not limited to using a hardware-dependent model.

The failure rate is characterized, in one or more embodiments, as a prediction of the number of memory failures occurring over a prescribed period of time, which may be referred to as a failure-in-time (FIT) rate. The failure rate may also be represented as a mean-time-between-failure (MTBF) rate, which can be determined as a reciprocal of the FIT rate (i.e., MTBF=1/FIT).

Various hardware components 102 of the HPC system 100 may have individual memories 105 associated therewith.

Each of these hardware components may be subject to various types of failures, which may be determined through a particular failure model or test. The failure types may include, but are not limited to, NBTI, PBTI, EM, TDDB, and HCI, among other failure mechanisms. In one or more embodiments, each failure type has its own equation for the FIT rate of the corresponding hardware component it is predicting. When multiple components are involved, their respective FIT rates are combined (e.g., summed) to represent the larger domain of the HPC system which includes these multiple components. In other instances, when redundant hardware components are built into the HPC system, a minimum FIT rate of all of the redundant hardware components is used to represent the FIT rate of the overall HPC system. With respect to the FIT rate, according to one or more embodiments, HPC systems with spare hardware components may be handled in a manner consistent with an HPC system having redundant hardware components, except that the utilization of the spare hardware components is conditioned on the FIT rate of the primary components. In some embodiments, when a hardware component is subject to multiple failure types, the FIT rate for each failure type can be calculated independently, and the overall FIT rate for the hardware component is calculated by summing the respective FIT rates of each failure type.

As shown in FIG. 1, the software components 104 in the illustrative system 100 include an operating system (OS) 116, a runtime module 124, which may be part of a runtime library of executable software functions, and an application 126. The operating system 116 comprises a memory manager 117 and a fault-tolerant execution support module 118 operatively coupled with the memory manager module. The memory manager 117 interfaces with the memory 105 and is operative to control (i.e., manage) the storage of data and/or programs in the system memory (e.g., memory 105), to keep track of such data and programs, and to reclaim memory space when no longer in use, among other functions. The memory manager 117 communicates with the health tracking module 114 and is operative to receive a signal(s) generated by the health tracking module which conveys information relating to memory health status. For example, the signal received from the health tracking module 114 may indicate that an imminent failure is predicted to occur in memory regions affecting memory page (n−1) 110 in a time period of about 10 milliseconds (ms). Furthermore, the memory manager 117 may transmit information to, or receive information from, the health tracking module 114 regarding uncorrected error monitoring.

With regard to uncorrected error monitoring, after a first memory failure occurs, errors are predicted to continue to occur at a given rate. These failures will often generate machine check exceptions, which instead of necessarily causing a fault-stop, can be monitored when affecting data identified as error-tolerant. These events are monitored, in accordance with one or more embodiments, and compared with the predicted error rate for consistency.

The fault-tolerant execution support module 118 is implemented at the operating system level and includes, in one or more embodiments, a memory page assessment module 120 and a page reassignment module 122. The memory page assessment module 120 communicates with the memory manager 117 for accessing one or more memory pages 106 through 111 of the memory 105 to thereby obtain information regarding the type of data stored in the memory pages. This information is used by the memory page assessment module 120 for determining an error tolerance of at least a subset of the memory pages. More particularly, the memory page assessment module 120, as a function of a notification signal indicating an imminent failure to a specified memory area in a predicted timeframe, is operative to classify one or more memory pages associated with the specified memory region as being either error-tolerant (i.e., being able to function in the presence of a prescribed number of uncorrected errors) or non-error-tolerant (i.e., not being able to function in the presence of uncorrected errors).

An assessment of the data in identified memory pages thus yields either an error-tolerant or a non-error-tolerant classification for the memory pages. Both possibilities can reside in either kernel or user spaces. In kernel space (i.e., reserved memory pages for running privileged kernel processes), all migratable memory pages are classified as non-error-tolerant. Predictable memory failures affecting memory pages that cannot be migrated results in a predictable operating system crash. In user space (e.g., application 126), an application programming interface (API), or alternative mechanism, allows a programmer to provide hints, which may be in the form of annotations in the source code that invokes specific allocation functions used at runtime for memory allocation, for instance, of an application's data regions (e.g., fault-tolerant data structures 130) that tolerate some degree of errors in allocating failable memory, and to indicate an error-tolerance threshold for those fault-tolerant data structures. Memory pages that are not used for failable memory allocation are classified as non-error-tolerant, and thus do not have an error-tolerance threshold associated therewith. An application-level fault management module 132 represents application code operative to handle notifications of predictable and unavoidable failure. A programmer defines the actions to be performed in response to such notifications. For example, notification of a predictable failure may trigger application-level actions to mitigate or recover from failure.

The memory page assessment module 120, upon determining that a given memory page under evaluation is non-error-tolerant, is operative to generate a notification signal indicating a predicted imminent failure to a non-error-tolerant memory area. This notification signal is supplied to the page reassignment module 122, which is then operative to initiate a proactive memory page migration action.

The notification signal indicating an imminent failure to a non-error-tolerant memory area triggers a proactive memory page migration action. A search for a possible available replacement memory page is performed and a required time frame for migration is assessed. In case a healthy replacement page is identified and enough time is available to safely migrate the data before a failure is likely to occur, a process is created to migrate the memory page to the identified healthy memory location (i.e., a memory location which is not determined to produce an imminent memory failure). The memory page migration process, according to one or more embodiments, is performed in a manner which does not disrupt running applications. Page memory availability for proactive data movements can be regulated, such as, for example, by defining priority policies for data overwriting or memory reservation.

In one or more embodiments, an action time window and estimated time to complete the migration determines a slowdown of the memory area holding the data to avoid inducing errors. Specifically, in some instances, the frequency with which the memory operates can be dynamically controlled by the memory controller, which interacts with the memory manager. In case the frequency can be adjusted with some granularity, as well as the time needed to perform data migration, the memory can be slowed down to avoid inducing errors. This is related to the fact that memory failure is impacted by read/write operations.

The migration process can fail to start for one or more reasons, including, for example, the unavailability of replacement memory pages to which to migrate the data, or insufficient time to complete the data migration before a predicted failure is likely to occur. A failure in starting the migration process yields the signaling of an imminent failure to the application. If the memory page or area involved resides in kernel space, a failure of the operating system is known to be imminent, and running applications are notified about the imminent failure event for application-level checkpointing, if available. In case the identified memory page or area resides in user space, the application-level fault management module 132 is notified, indicating the memory page is about to fail.

Error-tolerant data, by definition, allows for a certain degree of corruption and is therefore handled differently. Specifically, in the case of a notification indicating a predicted imminent failure to a memory area classified as containing error-tolerant data, the operating system 116 is operative to determine whether or not to tolerate the error. In one or more embodiments, this is achieved using an error tolerance threshold. The error tolerance threshold may be specified by the application 126, and an expected uncorrectable error rate after the failure occurrence is used to determine whether to initiate the data migration process. If the corruption is tolerable, the application 126 is notified about the expected uncorrectable error rate and a memory address range of the faulty memory page is supplied to the application. Health tracking notifications, generated by the health tracking module 114, may be used to ensure that observed uncorrected errors remain below the specified threshold. In case an intolerable corruption is identified, the data migration process is started and the application 126 is notified in a manner consistent with the non-error-tolerant case.

Figure 4:
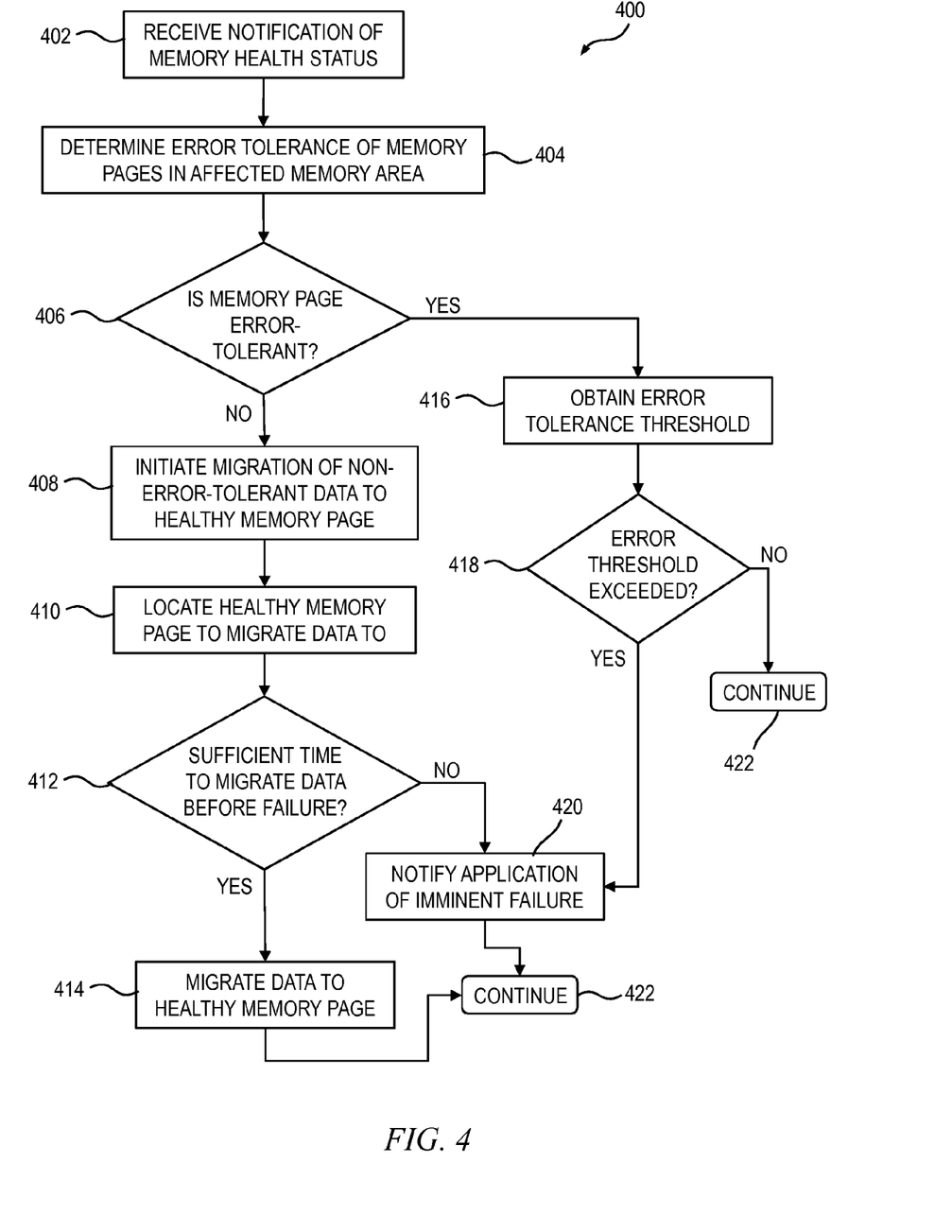
FIG. 4 is a flow chart depicting at least a portion of an exemplary method detailing an operation of the illustrative system shown in FIG. 1, according to an embodiment of the invention.

FIG. 4 is a flow diagram depicting at least a portion of an exemplary method 400 for performing a proactive migration of data in anticipation of an imminent memory failure, according to an embodiment of the invention. As previously stated, the operating system (e.g., memory manager 117 in FIG. 1) receives a notification of memory health status in step 402 indicative of the predicted occurrence of an imminent memory fault within a specified amount of time. As shown in FIG. 1, by way of example only and without limitation, the health tracking module 114 sends a signal to the memory manager 117 indicating that a fault in memory page (n−1) 110 is predicted to occur in 10 ms. In one or more embodiments, the memory manager 117 may poll the health tracking module 114 at prescribed time intervals to obtain health status information relating to the memory pages 106 through 111 in memory 105. In step 404, a determination is made regarding the error tolerance of one or more memory pages in the memory area to be affected by the predicted memory fault. In one or more embodiments, this error tolerance determination is made by first classifying the memory pages (e.g., virtual memory pages in an area to be affected by the memory failure) as containing data that is either non-error-tolerant or error-tolerant. This may be performed, for example, by the memory page assessment module 120 in the fault-tolerant execution support module 118 of the operating system 116.

In step 406, a determination is made, based on the classification of the memory pages, as to whether a memory page in the memory area to be affected by the predicted memory fault is non-error-tolerant or not. If the memory page is determined to be non-error-tolerant, a proactive migration of the data residing in that memory page to a healthy memory page is initiated in step 408. This may be accomplished, for example, using the page reassignment module 122 and memory manager 117 in the operating system 116 shown in FIG. 1.

As part of the process of migrating data to a new memory page, step 410 is operative to search for a healthy memory page to which data will be moved. In step 412, a determination is made as to whether there is sufficient time to migrate the data to the new memory page. This is preferably accomplished by evaluating a time period before the memory failure is predicted to occur, which may be supplied by the health tracking module (e.g., 114 in FIG. 1), relative to the time necessary to move the data. The time required to migrate the data will be dependent, at least in part, on the amount of data and how the operating system (OS) implements the migration, in one or more embodiments. If it is determined that there is sufficient time to move the data, the data is migrated to the healthy memory page in step 414; otherwise, data is not migrated and a notification is sent to the application at step 420 indicating that an imminent memory failure will likely occur. At this point, the method 400 continues at step 422 to monitor the memory health status.

At step 406, if it is determined that the memory page which will be affected by a predicted imminent memory failure contains data that is error-tolerant, an error tolerance threshold is obtained in step 416. As previously stated, the error tolerance threshold may be specified by the application itself, or by an alternative means, and an expected uncorrectable error rate after the failure occurrence is used to determine whether to initiate the data migration process. In the illustrative method 400, the determination as to whether the corruption is tolerable comprises evaluating the error threshold in step 418 to determine whether the threshold has been exceeded. If the error threshold has been exceeded, a notification is sent to the application in step 420 that an imminent memory failure is likely to occur. Alternatively, if the corruption is tolerable, the method 400 continues at step 422. At this point, the application 126 is notified about the expected uncorrectable error rate and a memory address range of the faulty memory page is supplied to the application and the faulty memory page continues to be used until the error threshold is exceeded.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 5:
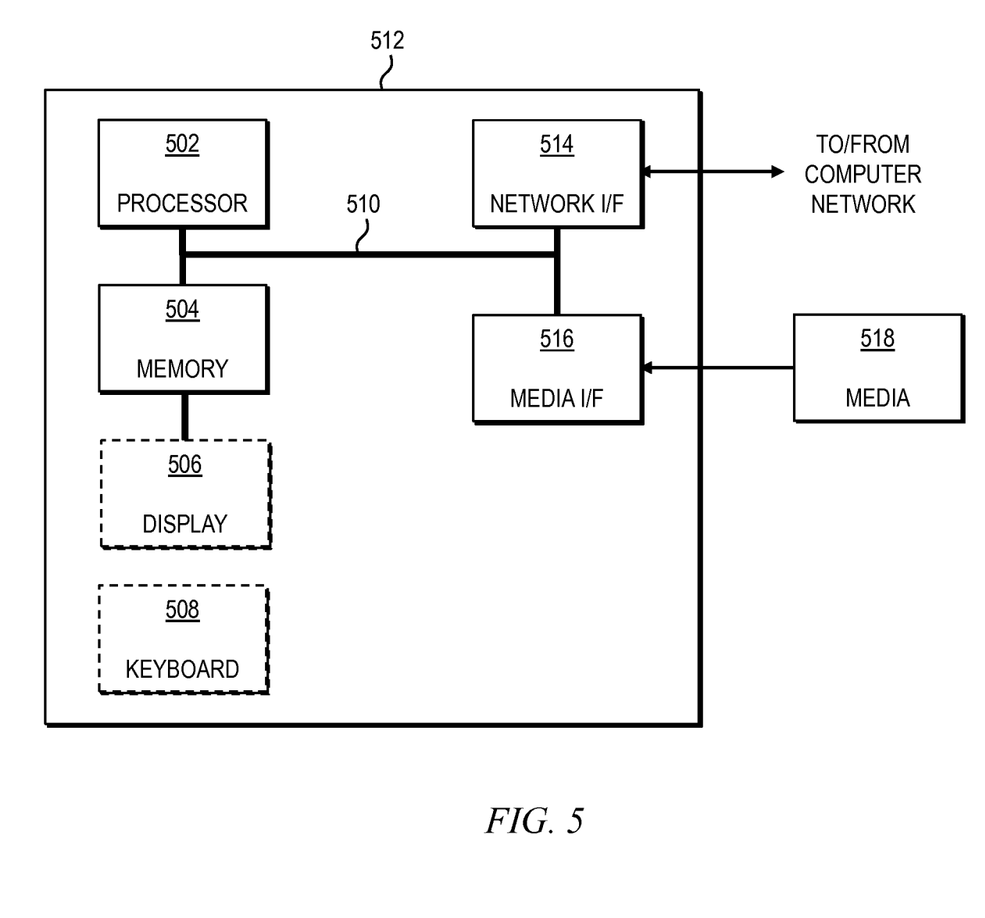
FIG. 5 is a block diagram depicting at least a portion of an exemplary computer system that may be useful in implementing one or more aspects and/or elements of the invention.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a memory health tracking module, and a notification setting module. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The embodiments of the invention described herein are intended to provide a general understanding of the various embodiments, and are not intended to serve as a complete description of all the elements and features of apparatus and systems that might make use of the structures described herein. Other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other embodiments of the invention. Although embodiments of the invention have been described herein with reference to the accompanying drawings, it is to be understood that embodiments of the invention are not limited to the described embodiments, and that various other embodiments within the scope of the following claims will be apparent to those skilled in the art given the teachings herein.

What is claimed is:

1. A method for facilitating faulty memory utilization in a memory system, the method comprising:
   obtaining information regarding memory health status of at least one memory page in the memory system;

determining an error tolerance of the at least one memory page when the information regarding memory health status indicates that a failure is predicted to occur in an area of the memory system affecting the at least one memory page;

initiating a migration of data stored in the at least one memory page when it is determined that the data stored in the at least one memory page is non-error-tolerant;

notifying at least one application regarding at least one of a predicted operating system failure and a predicted application failure when it is determined that data stored in the at least one memory page is non-error-tolerant and cannot be migrated;

notifying at least one application regarding the memory failure predicted to occur when it is determined that data stored in the at least one memory page is error-tolerant, whereby the at least one memory page continues to be used.

2. The method of claim 1, wherein the step of initiating a migration of data comprises migrating the data stored in the at least one memory page to a memory page determined to be unaffected by a predicted memory failure in the memory system.

3. The method of claim 1, wherein the step of determining the error tolerance of the at least one memory page comprises assessing an error tolerance of data in at least one corresponding virtual memory page to be affected by a predicted memory failure in the memory system.

4. The method of claim 3, wherein the step of assessing the error tolerance of data in the at least one corresponding virtual memory page comprises:

identifying at least one memory page mapped to corresponding physical memory to be affected by the predicted memory failure; and classifying the data into one of error-tolerant data and non-error-tolerant data.

5. The method of claim 4, wherein migratable kernel-space pages are classified as non-error-tolerant data and user-space pages are classified as error-tolerant data or non-error-tolerant data.

6. The method of claim 1, wherein the step of obtaining information regarding memory health status of at least one memory page comprises receiving a notification indicating at least one of a memory range to be affected by a predicted memory failure, an expected time before the memory failure is likely to occur, and an uncorrectable memory error rate expected after occurrence of the memory failure.

7. The method of claim 1, wherein the step of initiating a migration of data comprises:

locating at least one memory page unaffected by a predicted memory failure;

obtaining a time before the predicted memory failure is likely to occur;

determining whether there is sufficient time to migrate the data based on at least one of the time before the predicted memory failure is likely to occur and an anticipated time to complete the migration of data.

8. The method of claim 1, further comprising:

obtaining an error tolerance threshold when it is determined that the data stored in the at least one memory page is error-tolerant;

determining whether the error tolerance threshold has been exceeded;

sending a notification to an application indicating an expected uncorrectable error rate corresponding to the at least one memory page when it is determined that the data stored in the at least one memory page is error-tolerant;

sending a memory address range of the at least one memory page to the application when it is determined that the data stored in the at least one memory page is error-tolerant, whereby the at least one memory page continues to be used by the application.

9. The method of claim 8, wherein the step of sending a notification to an application comprises generating a notification signal indicating an area of the memory system predicted to fail and a time period before predicted memory failure, the notification signal being used in application-level fault management.

10. The method of claim 1, wherein the method is performed without disrupting execution of an application running on the memory system.

11. The method of claim 1, further comprising:

monitoring an uncorrected error rate affecting error-tolerant data allocated in at least one memory area including a predicted memory failure; and ensuring that the uncorrected error rate is below an error-tolerance threshold defined in an application running on the memory system.

12. The method of claim 1, further comprising providing an application programming interface, wherein the step of determining an error tolerance of the at least one memory page comprises identifying at least one data region adapted to tolerate a prescribed degree of data corruption via the application programming interface.

13. The method of claim 12, further comprising enabling a programmer to identify data regions that are error-tolerant when writing an application utilizing the application programming interface.

14. An apparatus for facilitating faulty memory utilization in a memory system, the apparatus comprising:

a memory;

a health tracking module operative to obtain information regarding memory health status of at least one memory page in the memory; and at least one processor in communication with the memory and health tracking module, the at least one processor being operative: to receive the information regarding memory health status; to determine an error tolerance of the at least one memory page when the information regarding memory health status indicates that a failure is predicted to occur in an area of the memory affecting the at least one memory page; to initiate a migration of data stored in the at least one memory page when it is determined that the data stored in the at least one memory page is non-error-tolerant; to notify at least one application regarding at least one of a predicted operating system failure and a predicted application failure when it is determined that data stored in the at least one memory page is non-error-tolerant and cannot be migrated; and to notify at least one application regarding the memory failure predicted to occur when it is determined that data stored in the at least one memory page is error-tolerant, whereby the at least one memory page continues to be used.

15. The apparatus of claim 14, wherein the at least one processor comprises a memory manager coupled with the memory and operative to control a storage of at least one of data and programs in the memory, the memory manager being configured to receive the information regarding memory health status from the health tracking module.

16. The apparatus of claim 14, wherein the at least one processor comprises a memory page assessment module operative to receive information regarding a type of data stored in one or more memory pages of the memory and to determine an error tolerance of at least one of the memory pages as a function of the type of data stored in the memory pages when the information regarding memory health status indicates that a failure is predicted to occur in an area of the memory affecting the at least one memory page.

17. The apparatus of claim 14, wherein the at least one processor comprises a memory page reassignment module operative to receive a notification signal indicating a predicted imminent failure to a non-error-tolerant memory area and to initiate a proactive memory page migration action in response to the notification signal when it is determined that the data stored in the at least one memory page is non-error-tolerant.

18. The apparatus of claim 17, wherein the memory page reassignment module is further operative to notify at least one application regarding at least one of a predicted operating system failure and a predicted application failure when it is determined that data stored in the at least one memory page is non-error-tolerant and cannot be migrated, and to notify at least one application regarding the memory failure predicted to occur when it is determined that data stored in the at least one memory page is error-tolerant.

19. The apparatus of claim 14, further comprising an application program interface operative to determine an error tolerance of the at least one memory page by identifying at least one data region adapted to tolerate a prescribed degree of data corruption.

20. A computer program product for facilitating faulty memory utilization in a memory system, comprising a non-transitory computer readable storage medium having computer readable program code embodied therewith, said computer readable program code comprising:

computer readable program code configured to obtain information regarding memory health status of at least one memory page in a memory system;

computer readable program code configured to determine an error tolerance of the at least one memory page when the information regarding memory health status indicates that a failure is predicted to occur in an area of the memory system affecting the at least one memory page;

computer readable program code configured to initiate a migration of data stored in the at least one memory page when it is determined that the data stored in the at least one memory page is non-error-tolerant;

computer readable program code configured to notify at least one application regarding at least one of a predicted operating system failure and a predicted application failure when it is determined that data stored in the at least one memory page is non-error-tolerant and cannot be migrated; and computer readable program code configured to notify at least one application regarding the memory failure predicted to occur when it is determined that data stored in the at least one memory page is error-tolerant, whereby the at least one memory page continues to be used.

* * * * *